(12) United States Patent
Yoshioka et al.

(10) Patent No.: US 10,728,410 B2
(45) Date of Patent: Jul. 28, 2020

(54) READING DEVICE

(71) Applicant: SEIKO EPSON CORPORATION, Tokyo (JP)

(72) Inventors: Ichiro Yoshioka, Torrance, CA (US); Makoto Hoshina, Matsumoto (JP); Yoriko Hama, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/247,771

(22) Filed: Jan. 15, 2019

(65) Prior Publication Data

US 2019/0222705 A1 Jul. 18, 2019

(30) Foreign Application Priority Data

Jan. 18, 2018 (JP) .................................. 2018-006211

(51) Int. Cl.
*H04N 1/04* (2006.01)
*H04N 1/40* (2006.01)
*H04N 1/00* (2006.01)

(52) U.S. Cl.
CPC ..... *H04N 1/00891* (2013.01); *H04N 1/00241* (2013.01); *H04N 1/00928* (2013.01)

(58) Field of Classification Search
None
See application file for complete search history.

(56) References Cited

U.S. PATENT DOCUMENTS

| 4,947,262 A * | 8/1990 | Yajima | B41J 3/36 |
| | | | 347/222 |
| 8,670,164 B2 * | 3/2014 | Lu | H04N 1/38 |
| | | | 358/488 |
| 2010/0321745 A1 * | 12/2010 | Van Os | H04N 1/0049 |
| | | | 358/498 |
| 2012/0231852 A1 * | 9/2012 | Forstall | G06F 9/4451 |
| | | | 455/566 |
| 2015/0319322 A1 | 11/2015 | Kanaya | |
| 2016/0080598 A1 * | 3/2016 | Chen | H04N 1/00525 |
| | | | 358/488 |

FOREIGN PATENT DOCUMENTS

| CN | 202602778 U | 12/2012 |
| JP | 2015-211450 A | 11/2015 |

* cited by examiner

*Primary Examiner* — Cheukfan Lee
(74) *Attorney, Agent, or Firm* — Workman Nydegger

(57) ABSTRACT

A reading device includes an imaging sensor that reads a document; a document-transporting unit that transports the document to a position facing the imaging sensor; a control unit that controls the imaging sensor and the document-transporting unit; a housing that covers the imaging sensor, the document-transporting unit, and the control unit; and a power switch electrically connected to the control unit; where a recessed portion is formed in the housing and the power switch is disposed in the recessed portion.

13 Claims, 10 Drawing Sheets

READING DEVICE

BACKGROUND

1. Technical Field

The present invention relates to a reading device.

2. Related Art

Reading devices that read characters and figures recorded on a medium such as paper and convert them into electronic data are widely used. Also, reading devices designed to be compact and lightweight are widely known. For example, refer to JP-A-2015-211450. A small and lightweight reading device is convenient to carry and an operator easily carries the reading device in a bag such as a briefcase, a backpack, or the like.

The reading device includes a document-transporting unit that transports a document and an imaging sensor that reads the document. The document-transporting unit moves the document to a position facing the imaging sensor. Then, the imaging sensor reads characters and figures written on the document and converts them into electronic data. The reading device includes a control unit and the control unit controls the document-transporting unit and the imaging sensor.

In addition, the reading device is provided with a battery and can be driven even when there is no external power supply. The reading device includes an openable/closable setting table on which a document is mounted and the reading device has an insertion port through which a document is inserted and which is continuous with a surface on the setting table. The setting table functions as a guide plate that guides the document to the insertion port.

The reading device of JP-A-2015-211450 includes a detection switch that detects opening and closing of the setting table. When an operator opens the setting table, the detection switch detects that the setting table has been opened. Then, the control unit shifts the driving state from a stopped state to a standby state in which the document-transporting unit and the imaging sensor can be driven. When the operator closes the setting table, the detection switch detects that the setting table has been closed. Then, the control unit shifts to the stopped state in which the document-transporting unit and the imaging sensor are not driven. In the stopped state, because the control unit does not supply a driving current to the document-transporting unit and the imaging sensor, the power consumption of the battery is small; however, in the standby state, because the control unit supplies a driving current to the document-transporting unit and the imaging sensor, power consumption of the battery is higher than that in the stopped state.

When the operator puts the reading device in a briefcase or a bag and carries it, the reading device may be shaken and the setting table may unexpectedly open. At this time, because the reading device enters the standby state and the power of the battery is consumed, the battery runs out of power. Therefore, there are cases where the reading device cannot drive the document-transporting unit and the imaging sensor at the time of use. Therefore, there has been a demand for a reading device capable of suppressing the consumption of electric power of the battery when it is not in use.

SUMMARY

An advantage of some aspects of the invention can be realized as the following aspects or application examples.

Application Example 1

A reading device according to this application example includes an imaging sensor that reads a document; a document-transporting unit that transports the document to a position facing the imaging sensor; a control unit that controls the imaging sensor and the document-transporting unit; a housing that covers the imaging sensor, the document-transporting unit, and the control unit; and a switch electrically connected to the control unit, where a recessed portion is formed in the housing and the switch is disposed in the recessed portion.

According to this application example, the reading device includes an imaging sensor, a document-transporting unit, a control unit, and a housing. A document is transported to a position where the document-transporting unit faces the imaging sensor. Then, the imaging sensor reads the document. The control unit controls the document-transporting unit and the imaging sensor. Transporting of the document and reading of the document are performed in parallel and the document is discharged to the outside of the reading device.

A switch is provided in the housing and the switch is electrically connected to the control unit. When an operator operates the switch, the control unit inputs a signal associated with the operation of the switch. Then, the control unit performs a predetermined operation according to the operation of the switch. The switch is provided in a recessed portion. Therefore, it is possible to suppress erroneous operation of the switch during transportation.

Application Example 2

In the reading device according to the application example described above, in the case where a document insertion side surface is a front side surface of the reading device and a document discharge side surface is a rear side surface of the reading device, it is preferable that a device upper surface be provided between the front side surface and the rear side surface, and the recessed portion be formed across the front side surface and the device upper surface.

According to this application example, because the switch is provided in the recessed portion formed across the front side surface and the device upper surface, erroneous operation of the switch can be suppressed and operability can be improved.

Application Example 3

In the reading device according to the application example described above, it is preferable that the recessed portion have a guide surface that guides the document that is transported and an erected surface that is erected from the guide surface toward the device upper surface, and the switch be arranged on the erected surface.

According to this application example, the switch is formed on the erected surface of the recessed portion. Therefore, erroneous operation of the switch can be suppressed and operability can be improved.

Application Example 4

In the reading device according to the application example described above, it is preferable that the recessed portion have wall portions on both sides of the housing in the longitudinal direction and a distance between a movable portion of the switch and a corresponding one of the wall portions be 1 cm or more and 5 cm or less.

According to this application example, the recessed portion has wall portions on both sides of the housing in the longitudinal direction. The wall portions correspond to side surfaces that are connected to the bottom surface of the recessed portion. The closer the movable portion of the switch is to a corresponding one of the wall portions, the less likely the switch will be operated erroneously; however, the harder it is to operate the switch. The distance between the movable portion of the switch and the wall portion is 1 cm or more and 5 cm or less. At this time, the switch is less likely to be erroneously operated by an object, but it can be easily operated when the operator wants to operate it.

Application Example 5

In the reading device according to the application example described above, it is preferable that the switch be a slide switch that has a movable portion that slides.

According to this application example, the switch is a slide switch. In the slide switch, the operator moves the movable portion along the surface on which the slide switch is provided. Because the switch is in the recessed portion, when an object moves in the depth direction of the recessed portion, the object often pushes the switch. However, in order for an object to operate the slide switch, it is first necessary for the object to reach the surface on which the slide switch is provided. Furthermore, it is necessary for the object to move the movable portion along the surface on which the slide switch is provided. In this manner, because the object needs to move in two directions in order to operate the slide switch, it is possible to inhibit the object from accidentally operating the slide switch.

Application Example 6

In the reading device according to the application example described above, it is preferable that the movable portion of the switch be urged by an elastic member.

According to this application example, the movable portion of the switch is urged by an elastic member. When the operator operates the switch, the operator moves the movable portion of the switch against the force of the elastic member. Then, the control unit inputs the signal associated with the operation of the switch. Thereafter, when the operator stops holding the movable portion, the movable portion is pressed by the elastic member and moves to the original position. Therefore, the operator operates the switch by applying stress only in one direction. On the other hand, when the movable portion is not urged by the elastic member, it is necessary for the operator to apply stress in one direction to move the movable portion and then apply stress in a direction opposite to the movement direction in order to move the movable portion back to its original position. Compared with this case, the operator can more easily operate the switch.

Application Example 7

In the reading device according to the application example described above, it is preferable that a first display unit for displaying information be provided on a device upper surface and a distance between the switch and the first display unit be 1 cm or more and 7 cm or less.

According to this application example, a first display unit for displaying information is provided in the housing. The distance between the switch and the first display unit is 1 cm or more and 7 cm or less. Because the distance between the switch and the first display unit is 1 cm or more, a portion of the housing can be arranged between the switch and the first display unit. Then, the housing can be configured to hold the switch and the first display unit. When the operator operates the switch, the operator can easily see the switch. At this time, because the distance between the first display unit and the switch is close, which is 7 cm, the operator can have the switch and the first display unit in their field of view at the same time. A control unit inputs a signal associated with the operation of the switch and causes the first display unit to display information in accordance with the input of the signal. At this time, the operator can easily confirm the operation of the switch.

Application Example 8

In the reading device according to the application example described above, it is preferable that the switch be a power switch, and the switch be disposed, with respect to the center of the housing in the longitudinal direction, on the side opposite to the center of gravity.

According to this application example, the power switch is disposed, with respect to the center of the housing in the longitudinal direction, on the side opposite to the center of gravity. When the operator stands up and holds the reading device, the heavier portion is on the lower side and the lighter portion is on the upper side. The lower side is the ground side and the upper side is the ceiling side. When the reading device is housed in a container that opens to the upper side, the upper side of the reading device is close to the opening. At this time, the operator can easily grasp the upper side of the reading device. In the housing, which is long, because the power switch is on the side gripped by the operator, the operator can easily turn on the power switch with one hand.

Application Example 9

In the reading device according to the application example described above, it is preferable that the switch be disposed on the right-hand side when the housing is viewed from the recessed portion side.

According to this application example, it is preferable that the power switch be disposed on the right-hand side when the housing is viewed from the recessed portion side. When the reading device is set on a desk, the power switch is arranged on the right-hand side. If the operator is right handed, the operator can easily turn on the power switch with the dominant right hand. In countries with many right-handed people, many people can easily operate the power switch.

Application Example 10

In the reading device according to the application example described above, it is preferable that a document insertion port that guides the document to the document-transporting unit be disposed in the recessed portion.

According to this application example, a document insertion port that guides the document to the document-transporting unit is disposed in the recessed portion. Accordingly, when an operator wants to perform an operation to read a document, the operator inserts the document into the document insertion port. The document insertion port is set in the recessed portion and the switch is provided in the recessed portion. Therefore, when the operator inserts the document into the document insertion port, it is possible to easily see the position of the switch.

Application Example 11

In the reading device according to the application example described above, it is preferable that the reading device further include a rechargeable battery and a second display unit that displays the state of charge of the rechargeable battery, the second display unit being arranged, with respect to the center of the housing in the longitudinal direction, on an end surface opposite to the center of gravity.

According to this application example, the reading device includes a rechargeable battery and a second display unit. The second display unit displays the state of charge of the rechargeable battery. An end surface, with respect to the center of the housing in the longitudinal direction, on the side opposite to the center of gravity is defined as a first side surface. The second display unit is disposed on the first side surface. When the operator stands up and holds the reading device, the heavier portion is on the lower side and the lighter portion is on the upper side. The lower side is the ground side and the upper side is the ceiling side. When the reading device is housed in a container that opens to the upper side, the first side surface of the reading device is close to the opening. At this time, the operator can easily see the second display unit arranged on the first side surface of the reading device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described with reference to the drawings. It is to be noted that in order to make each member in each drawing a recognizable size, each member is illustrated with a different scale.

Embodiment

Figure 1:
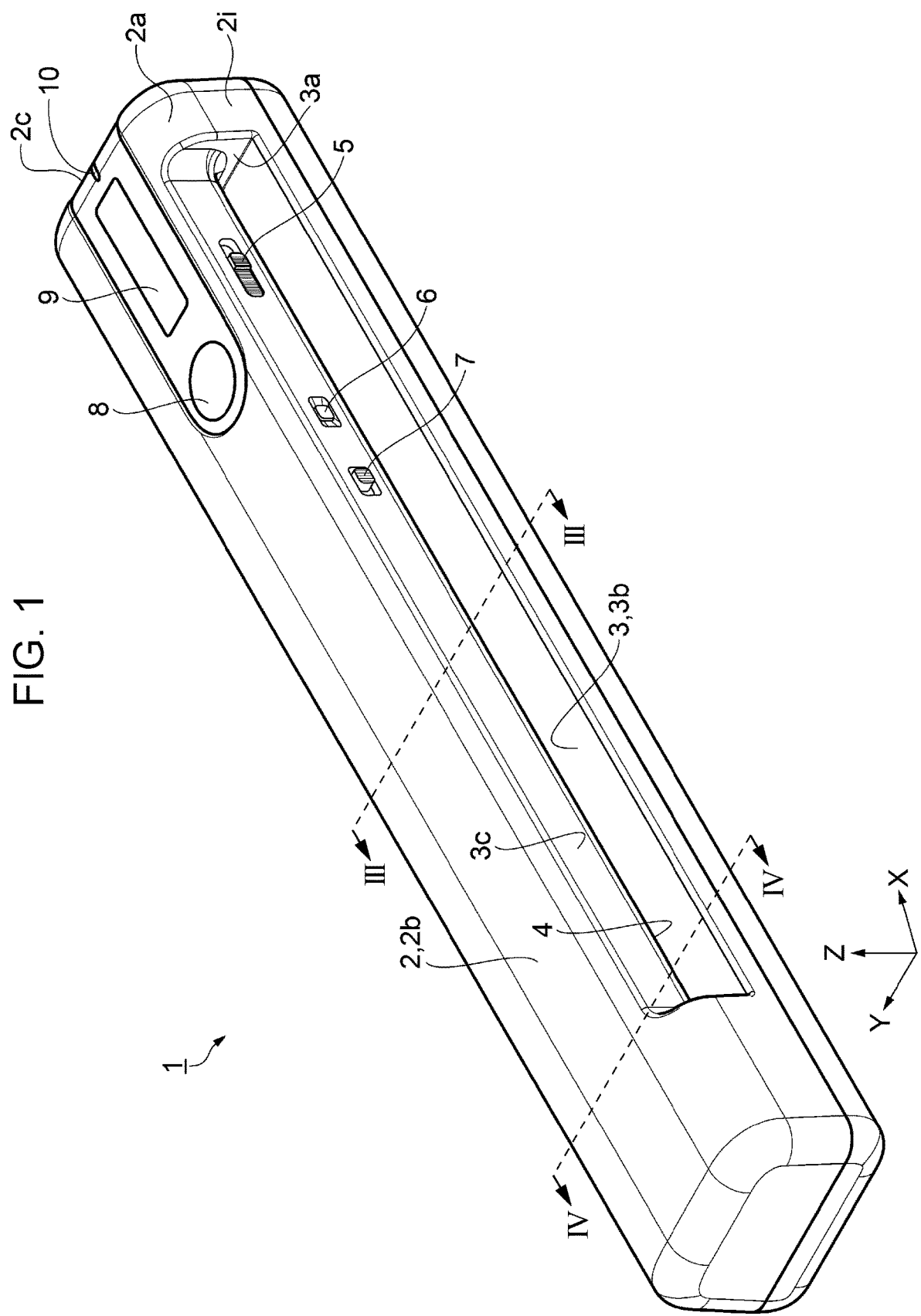
FIG. 1 is a schematic perspective view illustrating a configuration of a reading device.
Figure 2:
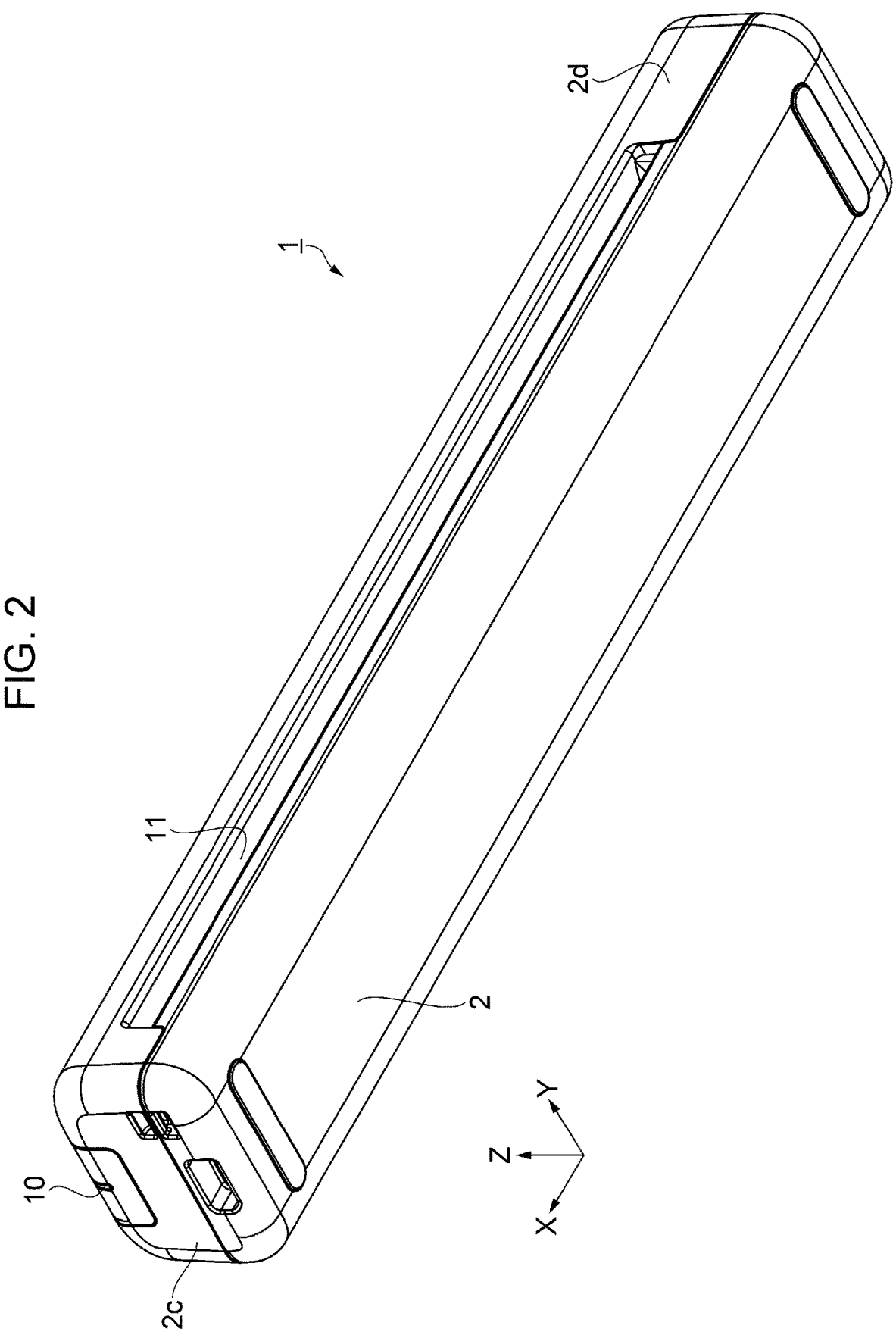
FIG. 2 is a schematic perspective view illustrating the configuration of the reading device.

In this embodiment, a characteristic example of a reading device will be described with reference to the drawings. The reading device according to the embodiment will be described with reference to FIG. 1 to FIG. 14. FIG. 1 and FIG. 2 are schematic perspective views illustrating a configuration of the reading device.

As illustrated in FIG. 1, a reading device 1 includes a housing 2 that has a long columnar shape in one direction. Let the longitudinal direction of the housing 2 be the X direction. The shape of the housing 2 when viewed from the X direction is substantially rectangular. The longitudinal direction of this rectangle is defined as the Y direction and the direction perpendicular to the X direction and the Y direction is defined as the Z direction.

In the housing 2, a recessed portion 3 is formed at corners in the +Z direction and the −Y direction. That is, the recessed portion 3 is formed across the document-insertion-side surface and the upper surface. In addition, the recessed portion 3 is formed in the middle in the X direction. In the housing 2, the +X side of the recessed portion 3 is not depressed but protrudes from the recessed portion 3. This protruding portion is referred to as a first projecting portion 2a.

The recessed portion 3 includes a first wall portion 3a as a wall portion on the first projecting portion 2a side of the housing 2 in the longitudinal direction. In the recessed portion 3, the surface facing in the +Z direction is a document guide surface 3b that serves as a guide surface that guides the document. The document guide surface 3b guides the document that is transported. In the recessed portion 3, an erected surface that is erected in the +Z direction and faces in the −Y direction is defined as a second wall portion 3c.

The recessed portion 3 includes the first wall portion 3a as a wall portion on the first projecting portion 2a side of the housing 2 in the longitudinal direction. In the recessed portion 3, the surface facing in the +Z direction is defined as the document guide surface 3b. In the recessed portion 3, the surface facing in the −Y direction is defined as the second wall portion 3c.

In the recessed portion 3, between the document guide surface 3b and the second wall portion 3c, a document insertion port 4 is formed. The document insertion port 4 is a place where an operator inserts a document. The operator moves the document along the document guide surface 3b and inserts the document into the document insertion port 4. As described above, the document insertion port 4 for guiding the document is disposed in the recessed portion 3. When an operator wants to perform an operation to read a document, the operator inserts the document into the document insertion port 4. The document insertion port 4 is provided in the recessed portion 3 and a power switch 5 that serves as a switch is disposed in the recessed portion 3. Therefore, when the operator inserts the document into the document insertion port 4, it is possible to easily see the position of the power switch 5.

On the second wall portion 3c, the power switch 5, a WPS switch 6 (Wi-Fi Protected Setup (registered trademark)), and a communication changeover switch 7 are provided. The power switch 5 is a switch for switching between a standby state and a stopped state. The power switch 5 is the switch that the operator first operates when operating the reading device 1.

When the housing 2 is viewed from the recessed portion 3 side, the power switch 5 is disposed on the right-hand side. When the reading device 1 is placed on a desk, the power switch 5 is arranged on the right-hand side. If the operator is right handed, the power switch 5 can be easily operated by the dominant right hand.

In the reading device 1, a wireless local area network (LAN) unit and a universal serial bus (USB) unit are provided as units for transmitting data to an external device. Then, by operating the communication changeover switch 7, the operator can select one of the wireless LAN unit and the USB unit as the unit for transmitting data.

When the operator selects the wireless LAN unit as the unit for transmitting data, the external device and the reading device 1 perform settings to communicate with each other. At this time, as the operator operates the WPS switch 6, the reading device 1 outputs a radio signal necessary for communication setting. The external device receives a radio signal necessary for communication setting and performs communication setting.

The surface on the +Z direction side of the housing 2 is defined as an upper surface 2b serving as a device upper surface and the surface on the +X direction side of the housing 2 is defined as a first side surface 2c serving as an end surface. A reading start switch 8, a first display unit 9 and a second display unit 10 are provided on the upper surface 2b. The reading start switch 8 is a switch for causing the reading device 1 to start reading a document.

The surface of the housing 2 on the −Y direction side is referred to as a front side surface 2i. The front side surface 2i is the side surface on which the document is inserted.

The second wall portion 3c is erected from the document guide surface 3b toward the upper surface 2b. The power switch 5 is disposed on the second wall portion 3c.

The first display unit 9 displays information such as the state of the reading device 1. The first display unit 9 displays whether or not the standby state has been established. In addition, the first display unit 9 displays the number of documents read by the reading device 1. A rechargeable battery is provided inside the housing 2. The first display unit 9 displays the remaining amount of power stored in the rechargeable battery. In addition, the first display unit 9 displays various kinds of information. A liquid crystal display device is used for the first display unit 9.

The second display unit 10 displays information on the state of the rechargeable battery of the reading device 1. For example, it displays whether the rechargeable battery is being charged or discharging. A light emitting diode (LED) capable of displaying multiple colors is used for the second display unit 10. The second display unit 10 displays information on the state of the rechargeable battery with the color for display changed. The second display unit 10 is provided at the corner where the upper surface 2b and the first side surface 2c are connected to each other. The first side surface 2c is visible from the +X direction and the +Z direction.

As illustrated in FIG. 2, a portion of the second display unit 10 is also provided on the first side surface 2c. The surface of the housing 2 on the +Y direction side is defined as a second side surface 2d serving as a rear side surface. A document discharge port 11 is provided on the second side surface 2d. A document inserted into the reading device 1 from the document insertion port 4 is discharged from the document discharge port 11. The second side surface 2d is the side surface from which the document is discharged. The upper surface 2b is located between the front side surface 2i and the second side surface 2d. The recessed portion 3 is formed so as to extend over the front side surface 2i and the upper surface 2b.

Figure 3:
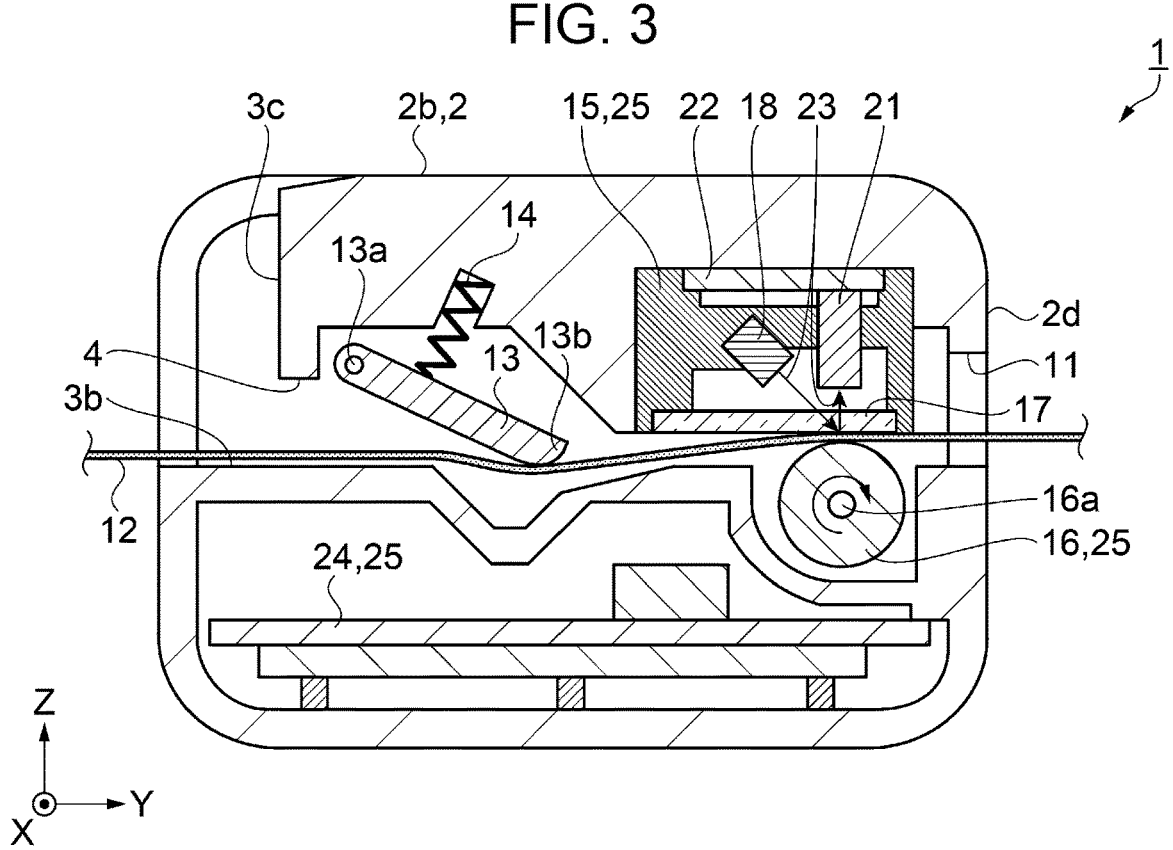
FIG. 3 is a schematic side cross-sectional view illustrating the configuration of the reading device.
Figure 4:
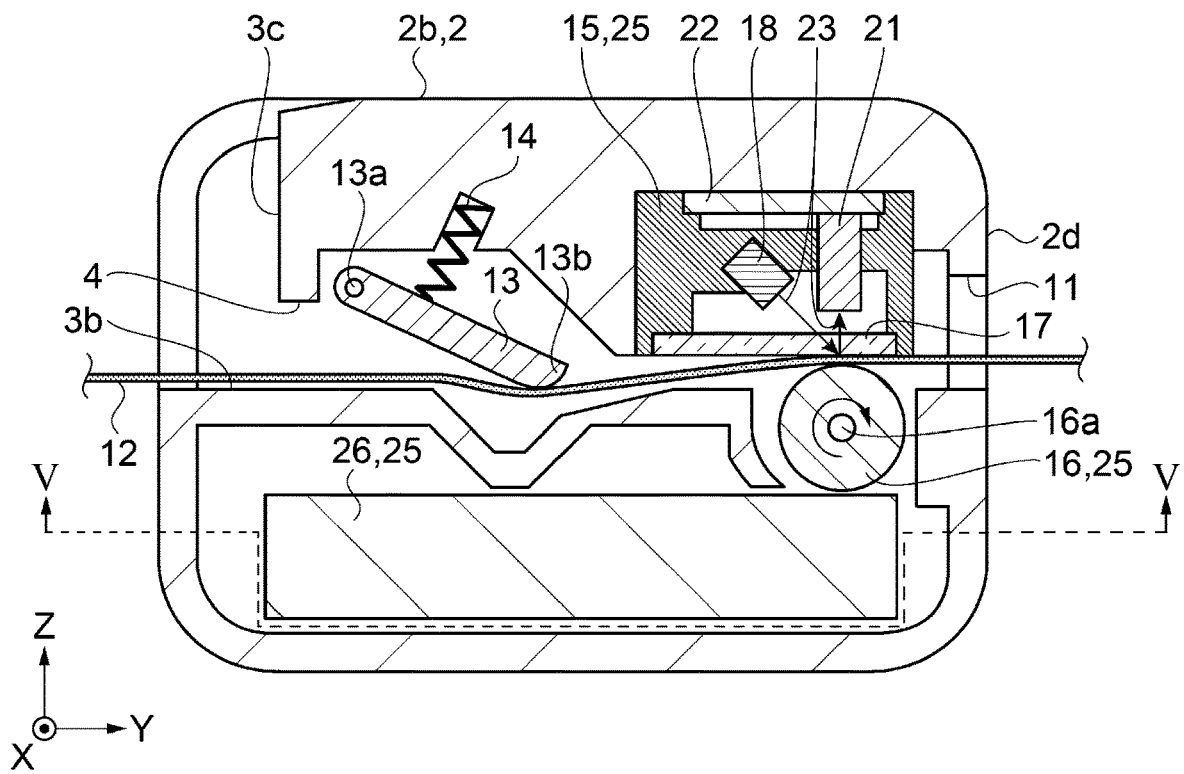
FIG. 4 is a schematic side cross-sectional view illustrating the configuration of the reading device.

FIG. 3 and FIG. 4 are schematic side cross-sectional views illustrating the configuration of the reading device. FIG. 3 is a schematic cross-sectional view taken along line III-III of FIG. 1 and illustrates a cross section in the middle of the reading device 1. FIG. 4 is a schematic cross-sectional view taken along line IV-IV of FIG. 1 and illustrates a cross section on the −X direction side. As illustrated in FIG. 3, the document guide surface 3b is provided from the outside of the document insertion port 4 to the inside of the reading device 1. A document 12 is inserted from the document insertion port 4 along the document guide surface 3b.

A document-pressing plate 13 is provided near the +Y direction side of the document insertion port 4. The document-pressing plate 13 is capable of swinging about a shaft 13a serving as a center of rotation. A pressing spring 14 is disposed on the +Z direction side of the document-pressing plate 13, and the pressing spring 14 urges the document-pressing plate 13. As a result, a front end 13b of the document-pressing plate 13 presses against the document 12.

An imaging sensor 15 and a document-transporting unit 16 are provided on the +Y direction side of the document-pressing plate 13. The document-transporting unit 16 has elasticity and has a cylindrical shape that is elongated in the X direction. The document-transporting unit 16 rotates around a shaft 16a serving as a center of rotation. The imaging sensor 15 has a document glass 17 and the document glass 17 is disposed at a position facing the document-transporting unit 16. When the operator inserts the document 12 into the document insertion port 4, the document 12 advances in the +Y direction along the document guide surface 3b. Then, the front end of the document 12 reaches a point between the document-transporting unit 16 and the document glass 17. The surface of the document-transporting unit 16 has high frictional resistance with the document 12 and the surface of the document glass 17 has low frictional resistance with the document 12. Therefore, when the document-transporting unit 16 rotates, the document 12 is moved in the +Y direction by the document-transporting unit 16. The document insertion port 4 serves as an insertion port that guides the document 12 to the document-transporting unit 16.

The imaging sensor 15 includes a light source 18, a line sensor 21, and a driving board 22. The light source 18 and the line sensor 21 are long in the X direction. The light source 18 irradiates light 23 toward the document 12. The light 23 passes through the document glass 17 and reaches the document 12. A portion of the light 23 reaching the document 12 is reflected by the document 12. The line sensor 21 is provided at a position opposed to the place where the document 12 is irradiated with the light 23. A portion of the light 23 reflected by the document 12 passes through the document glass 17 and reaches the line sensor 21. The line sensor 21 receives the light 23 reflected by the document 12 and converts it into an electric signal.

The driving board 22 is electrically connected to the light source 18 and the line sensor 21. A drive circuit for driving the light source 18 and the line sensor 21 is provided on the driving board 22. The driving board 22 supplies power to the light source 18 and controls the intensity of the light 23 irradiated by the light source 18. In addition, the driving board 22 amplifies and outputs the electric signal output by the line sensor 21.

The light source 18 irradiates the light 23 over a long area of the document 12 in the X direction. In the line sensor 21, a large number of phototransistors are arranged in the X direction. Therefore, the line sensor 21 detects the light 23 reflected in the long area of the document 12 in the X direction.

The document-transporting unit 16 transports the document 12 to a position facing the imaging sensor 15. Because there is shading on the surface of the document 12 caused by the image, the light 23 reflected by the document 12 has a distribution corresponding to the image. Then, the line sensor 21 detects the distribution of the light 23 in the long area in the X direction. The line sensor 21 detects the distribution of the light 23 in the X direction each time the document-transporting unit 16 moves the document 12 by a predetermined distance in the +Y direction. By repeating the movement of the document 12 by the document-transporting unit 16 and the detection of the distribution of the light 23 by the line sensor 21, the imaging sensor 15 reads the document.

When the document 12 is interposed between the document glass 17 and the document-transporting unit 16, because the document-pressing plate 13 presses against the document 12, tension acts on the document 12. Sagging of the document 12 is suppressed by the tension acting on the document 12.

A control unit 24 for controlling the imaging sensor 15, the document-transporting unit 16, and the like is provided on the −Z direction side of the document guide surface 3b. The control unit 24 includes a circuit board, and a control circuit including a CPU, a memory, and the like is provided on the circuit board. The light source 18, the line sensor 21, the power switch 5, the WPS switch 6, the communication changeover switch 7, the reading start switch 8, the first display unit 9, the second display unit 10, and the like are electrically connected to the control unit 24.

A main body 25 is constituted by the imaging sensor 15, the document-transporting unit 16, the control unit 24, and the like. The main body 25 including the imaging sensor 15, the document-transporting unit 16, and the control unit 24 is covered by the housing 2.

As illustrated in FIG. 4, on the −X direction side of the reading device 1, a rechargeable battery 26 is provided on the −Z direction side of the document guide surface 3b. For the rechargeable battery 26, a lithium ion battery, a nickel hydrogen battery, or the like can be used. The rechargeable battery 26 is also a portion constituting the main body 25. The rechargeable battery 26 and the second display unit 10 are electrically connected to the control unit 24. The second display unit 10 displays the state of charge of the rechargeable battery 26.

Figure 5:
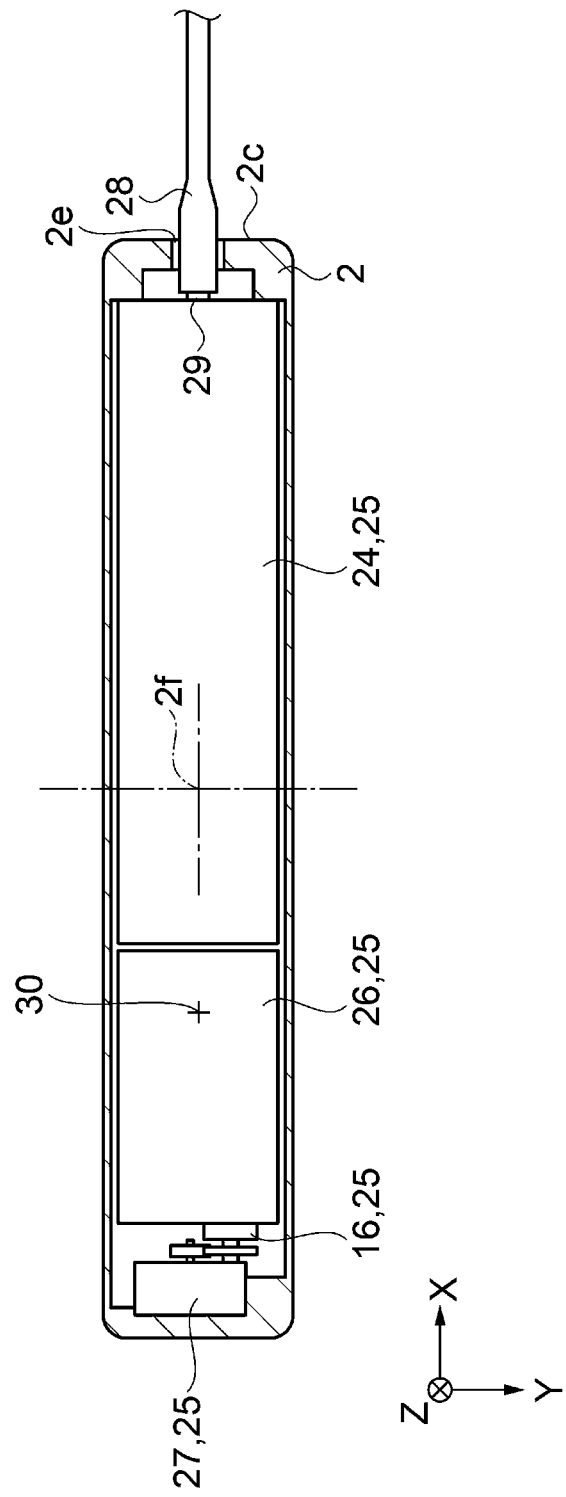
FIG. 5 is a schematic plan cross-sectional view illustrating the configuration of the reading device.

FIG. 5 is a schematic plan cross-sectional view illustrating the configuration of the reading device, is a schematic cross-sectional view taken along the line V-V in FIG. 4, and illustrates a cross section when viewed from the −Z direction side. As illustrated in FIG. 5, a motor 27 is provided on the −X direction side of the rechargeable battery 26. Gears are provided in the motor 27 and the document-transporting unit 16 and torque is transmitted to the motor 27 and the document-transporting unit 16 through the gears. The motor 27 is also a portion of the main body 25. The motor 27 is also covered by the housing 2.

A USB connector 29 that enables connection of a USB cable 28 is provided in the control unit 24. A first hole 2e through which the USB cable 28 may be inserted is provided on the first side surface 2c. The operator can insert the USB cable 28 into the USB connector 29 by inserting the USB cable 28 into the first hole 2e.

Among the portions constituting the main body 25, the rechargeable battery 26 and the motor 27 are heavy portions. The rechargeable battery 26 and the motor 27 are arranged on the −X direction side in the X direction. Therefore, a center of gravity 30 of the reading device 1 is positioned, with respect to a center 2f of the housing 2 as viewed from the Z direction side, on the −X direction side.

Figure 6:
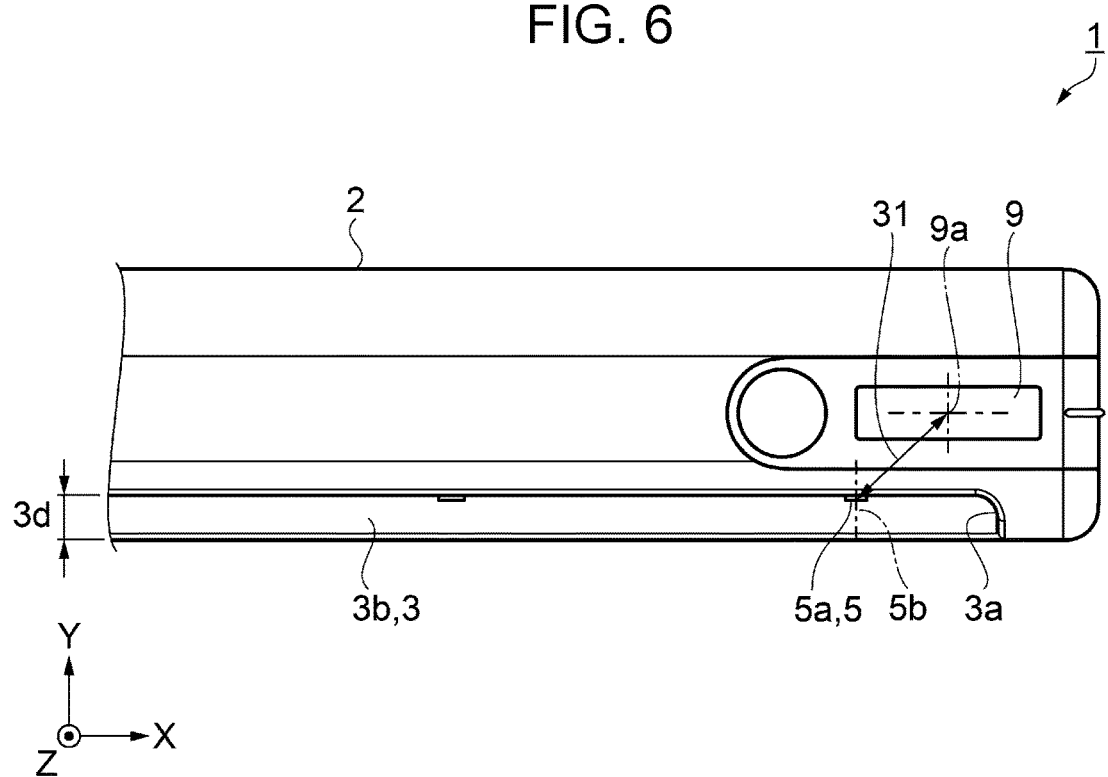
FIG. 6 is a schematic plan view of a main portion for explaining positions of a power switch and a first display unit.

FIG. 6 is a schematic plan view of a main portion for explaining positions of the power switch and the first display unit. As illustrated in FIG. 6, the distance between the power switch 5 and the first display unit 9 is set as a first distance 31. The power switch 5 includes a projecting portion 5a as a movable portion that protrudes in the −Y direction. The distance between a center 5b of the projecting portion 5a and a center 9a of the first display unit 9 when viewed from the Z direction is the first distance 31. The first distance 31 is preferably 1 cm or more and 7 cm or less. Furthermore, the first distance 31 is preferably 10 mm or more and 35 mm or less. Furthermore, the first distance 31 is preferably 20 mm or more and 24 mm or less.

Because the distance between the power switch 5 and the first display unit 9 is 1 cm or more, a portion of the housing 2 can be arranged between the power switch 5 and the first display unit 9. The housing 2 can be configured to hold the power switch 5 and the first display unit 9. When the operator wants to operate the power switch 5, the operator can easily see the power switch 5. At this time, because the distance between the first display unit 9 and the power switch 5 is close, which is 7 cm or less, the operator can have the power switch 5 and the first display unit 9 in their field of view at the same time. The control unit 24 inputs a signal associated with the operation of the power switch 5 and causes the first display unit 9 to perform display in accordance with the input of the signal. At this time, the operator can easily confirm that the operation of the power switch 5 has worked.

The Y direction length of the recessed portion 3 when viewed from the Z direction is defined as a recessed portion first depth 3d. The recessed portion first depth 3d is not particularly limited, but in the present embodiment it is, for example, 8 mm.

Figure 7:
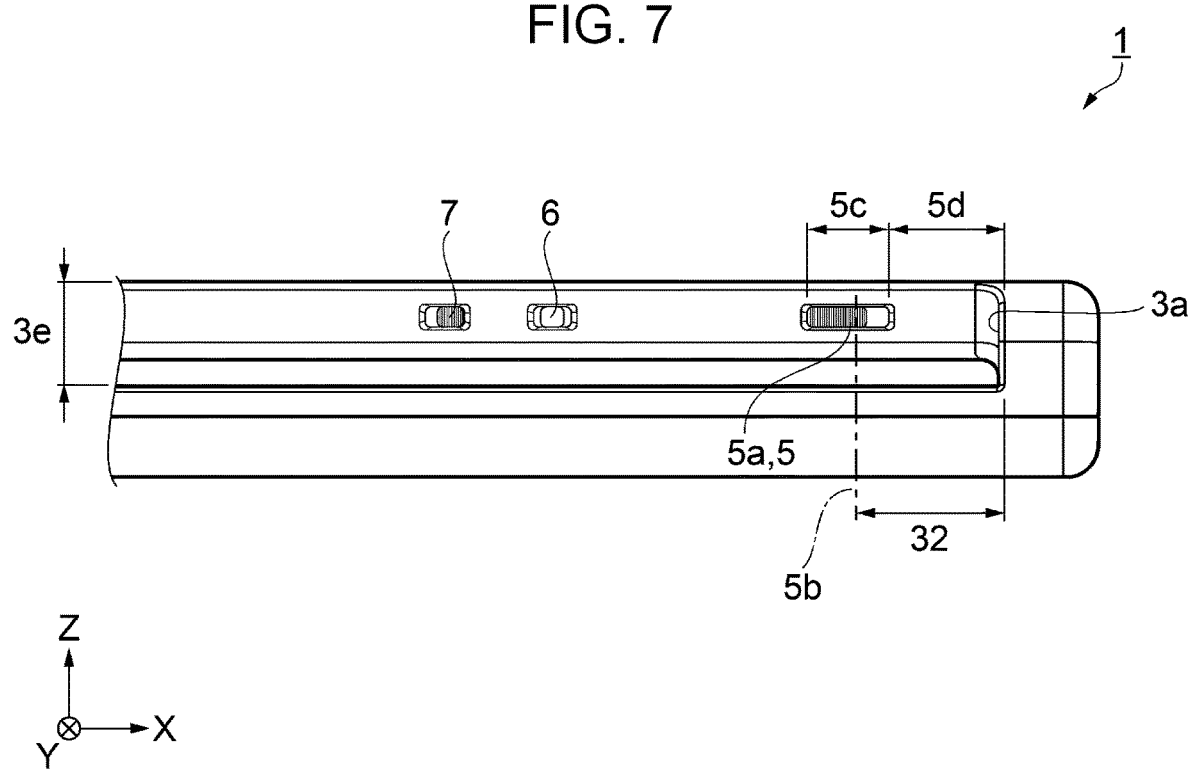
FIG. 7 is a schematic side view of a main portion for explaining the dimensions of the power switch.

FIG. 7 is a schematic side view of a main portion for explaining the dimensions of the power switch. As illustrated in FIG. 7, the Z direction length of the recessed portion 3 when viewed from the −Y direction is defined as a recessed portion second depth 3e. The recessed portion second depth 3e is not particularly limited, but in the present embodiment, it is, for example, 18 mm.

The distance between the +X direction end of the power switch 5 and the −X direction end of the power switch 5 when the power switch 5 moves in the X direction is set as a switch movement range 5c. Although the switch movement range 5c is not particularly limited, it is, for example, about 14 mm in the present embodiment. The distance between the switch movement range 5c and the first wall portion 3a is defined as a switch-wall distance 5d. The switch-wall distance 5d is not particularly limited, but in the present embodiment, it is, for example, about 19 mm.

The distance between the movable portion of the power switch 5 and the first wall portion 3a is defined as a second distance 32. Specifically, the second distance 32 indicates the distance between the center 5b of the projecting portion 5a and the first wall portion 3a. The second distance 32 is preferably 1 cm or more and 5 cm or less. Furthermore, the second distance 32 is preferably 1.5 cm or more and 3.5 cm or less. Furthermore, the second distance 32 is preferably 2 cm or more and 3 cm or less. The second distance 32 is not particularly limited, but in the present embodiment, it is, for example, about 25 mm.

The closer the projecting portion 5a of the power switch 5 is to the first wall portion 3a, the less likely the power switch 5 will be operated erroneously; however, the harder it is to operate the power switch 5. The distance between the projecting portion 5a of the power switch 5 and the first wall portion 3a is 1 cm or more and 5 cm or less. At this time, the power switch 5 is less likely to be erroneously operated by an object such as a box or a notebook, but it can be easily operated when the operator wants to operate it.

Figure 8:
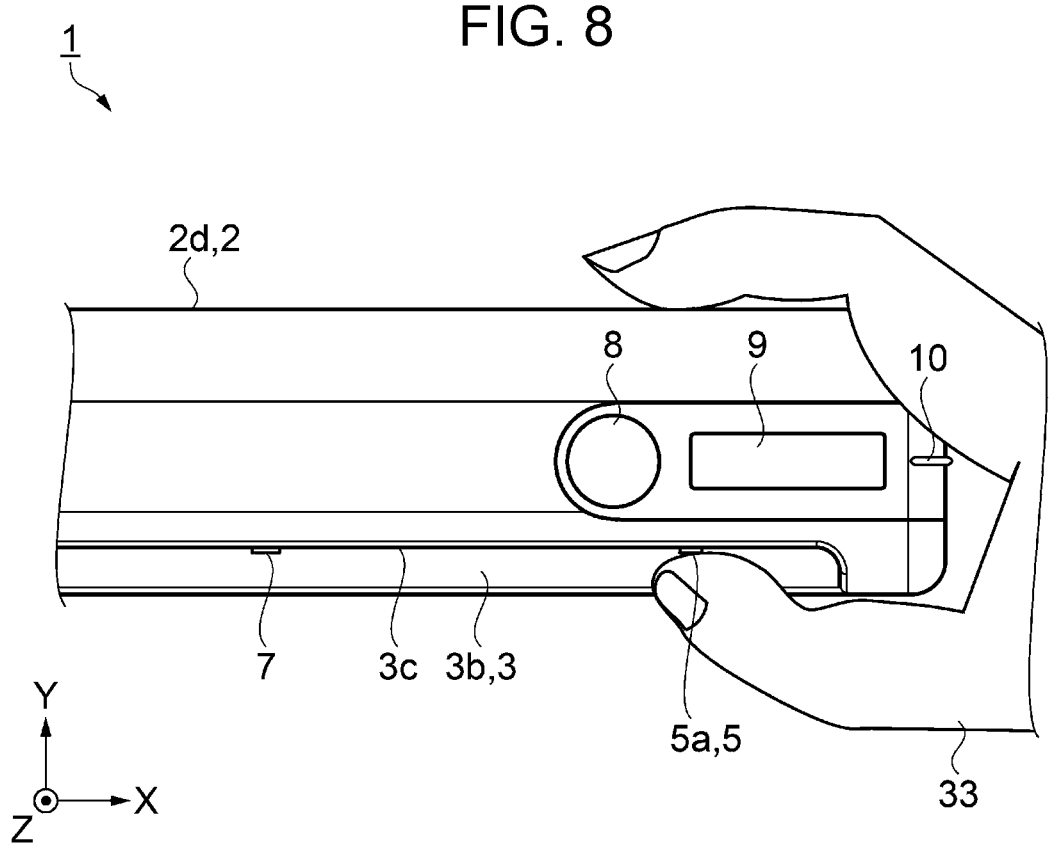
FIG. 8 is a schematic diagram for explaining a method of operating the power switch.

FIG. 8 is a schematic diagram for explaining a method of operating the power switch. As illustrated in FIG. 8, an operator 33 holds the reading device 1 by pinching the second side surface 2d and the second wall portion 3c with their fingers. At this time, the operator 33 can bring a finger into contact with the projecting portion 5a. The power switch 5 is a slide switch. To operate the slide switch, the operator 33 moves the projecting portion 5a along the surface on which the slide switch is provided. Because the power switch 5 is in the recessed portion 3, there is a high probability that, when an object moves in the depth direction of the recessed portion 3, the object will push the power switch 5. However, in order for the object to operate the slide switch, it is first necessary for the object to reach the second wall portion 3c on which the slide switch is provided. Furthermore, it is necessary for the object to move the projecting portion 5a along the second wall portion 3c on which the slide switch is provided. In this way, in order for the object to operate the slide switch, because it is necessary for the object to move in two directions, the Y direction and the X direction, it is possible to inhibit the object from accidentally operating the slide switch.

Figure 9:
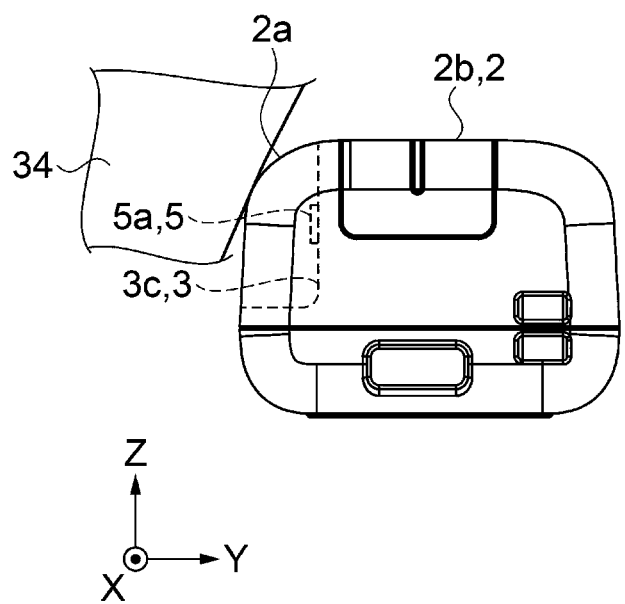
FIG. 9 is a schematic diagram for explaining that a housing inhibits contact of an object with the power switch.
Figure 10:
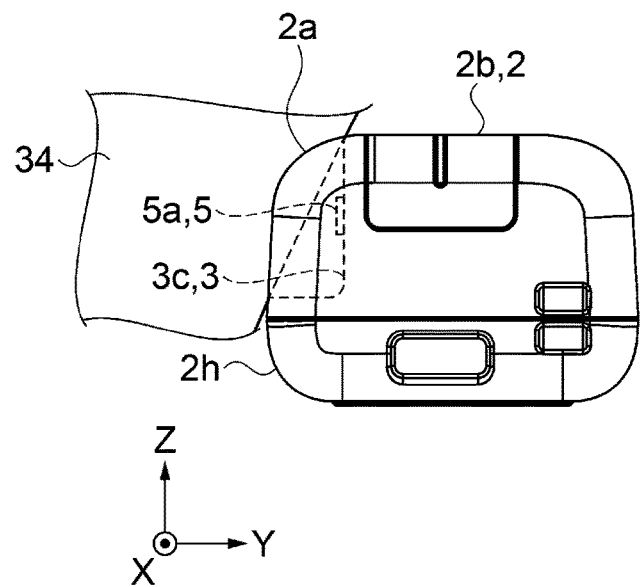
FIG. 10 is a schematic diagram for explaining that the housing inhibits contact of an object with the power switch.

FIG. 9 and FIG. 10 are schematic diagrams for explaining that the housing inhibits contact of an object with the power switch. As illustrated in FIG. 9, when there is an object 34 that is not fixed in the vicinity of the reading device 1, the housing 2 may be pressed against or hit by the object 34. The object 34 is, for example, a pencil case, a notebook, a small article container, a portable electronic device or the like, and is stored in a briefcase together with the reading device 1. When the object 34 approaches the reading device 1 from the −Y direction side, most of the object 34 hits the first projecting portion 2a. The power switch 5 is provided in the recessed portion 3. At this time, because the object 34 comes into contact with the outside of the housing 2, it hardly enters the recessed portion 3. Therefore, because it is difficult for the object 34 to reach the power switch 5, erroneous operation of the power switch 5 by the object 34 can be suppressed.

As illustrated in FIG. 10, when the object 34 does not hit the first projecting portion 2a, a portion of the object 34 enters the recessed portion 3. When the side surface of the housing 2 on the −Y direction side is a third side surface 2h, a portion of the object 34 hits the region where the third side surface 2h and the recessed portion 3 are connected to each other. In addition, a portion of the object 34 strikes a region where the upper surface 2b and the recessed portion 3 are connected to each other. Therefore, because it is difficult for the object 34 to reach the power switch 5, it is possible to suppress erroneous operation of the power switch 5 by the object 34.

Figure 11:
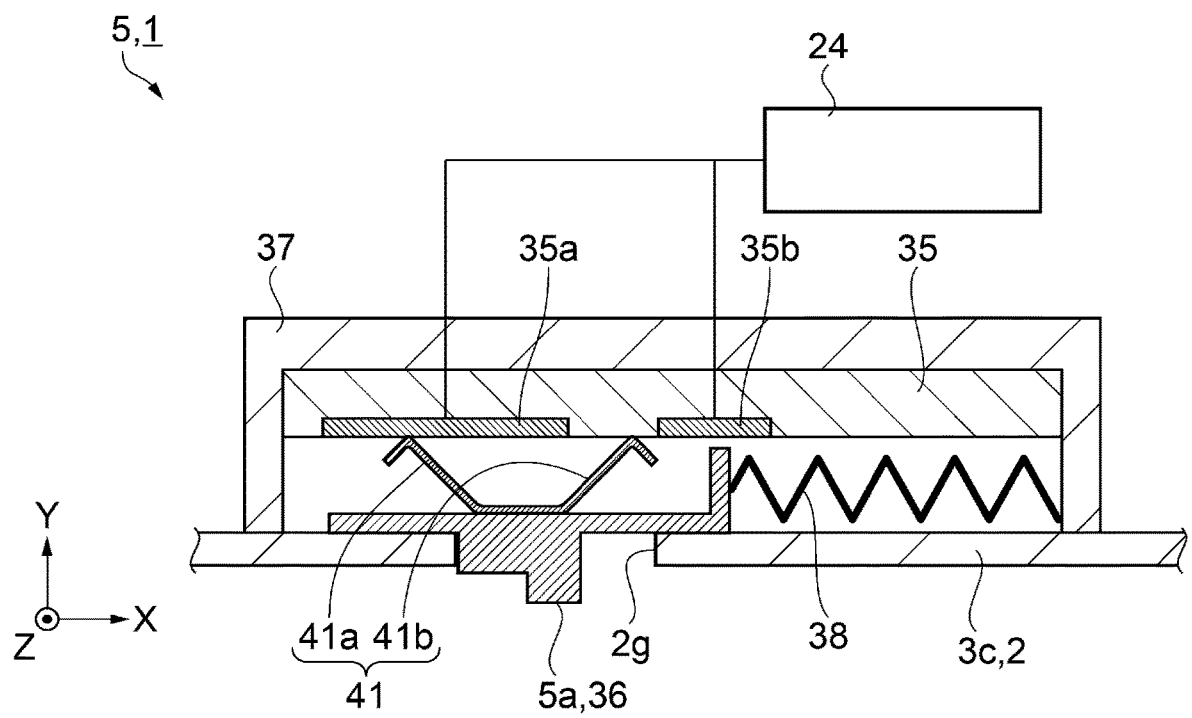
FIG. 11 is a schematic side cross-sectional view illustrating the configuration of the power switch.
Figure 12:
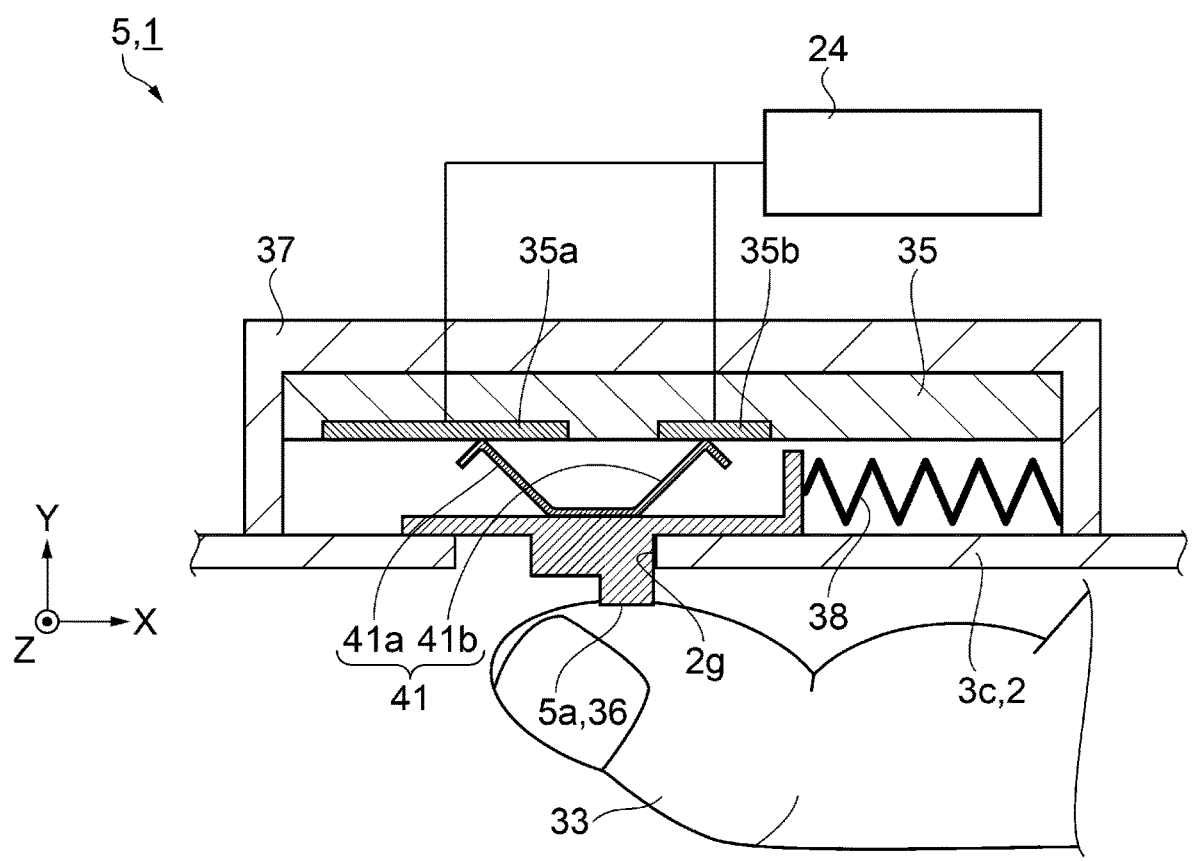
FIG. 12 is a schematic side cross-sectional view illustrating the configuration of the power switch.

FIG. 11 and FIG. 12 are schematic side cross-sectional views illustrating the configuration of the power switch. As illustrated in FIG. 11, the power switch 5 is provided with a circuit board 35 that has a rectangular shape that is elongated in the X direction. A first electrode 35a and a second electrode 35b are provided on the circuit board 35. The X direction side of the first electrode 35a is longer than that of the second electrode 35b. The first electrode 35a and the second electrode 35b are electrically connected to the control unit 24.

A movable portion 36 is provided on the −Y direction side of the circuit board 35. The power switch 5 is a slide switch that has the movable portion 36 that slides. The movable portion 36 is positioned between the circuit board 35 and the housing 2 and is movable in the X direction. A second hole 2g through which a portion of the movable portion 36 is exposed is provided in the housing 2. When the movable portion 36 moves in the X direction, because the movable portion 36 hits the second hole 2g, the movement range of the movable portion 36 is limited.

The circuit board 35 is supported by a support member 37 fixed to the housing 2. The distance between the circuit board 35 and the housing 2 is regulated to a predetermined distance. A spring 38 serving as an elastic member is provided on the +X direction side of the movable portion 36. The spring 38 is a coiled compression spring and is positioned between the support member 37 and the movable portion 36. Because the support member 37 is fixed to the housing 2, the spring 38 urges the movable portion 36. In the power switch 5, the movable portion 36 is urged by the spring 38.

The movable portion 36 is provided with a contact 41, and the contact 41 is provided with a first contact point 41a and a second contact point 41b which are electrically connected to each other. Because the contact 41 is formed of a leaf spring, the first contact point 41a and the second contact point 41b press against the circuit board 35. When the operator 33 does not operate the movable portion 36, the movable portion 36 is positioned on the −X direction side. At this time, the first contact point 41a is in contact with the first electrode 35a and the second contact point 41b is not in contact with the second electrode 35b. Accordingly, the first electrode 35a and the second electrode 35b are in an "OFF" state in which they are not electrically connected to each other.

As illustrated in FIG. 12, when the operator 33 performs an operation of sliding the movable portion 36 in the +X direction, the movable portion 36 moves to the +X direction side. At this time, the first contact point 41a contacts the first electrode 35a and the second contact point 41b contacts the second electrode 35b. Therefore, the first electrode 35a and the second electrode 35b enter an "ON" state in which they are electrically connected to each other.

When the operator 33 stops operating the movable portion 36, the movable portion 36 moves to the −X direction side. At this time, the first contact point 41a is in contact with the first electrode 35a and the second contact point 41b is not in contact with the second electrode 35b. Therefore, the first electrode 35a and the second electrode 35b enter an "OFF" state in which they are not electrically connected to each other.

In this manner, the operator 33 operates to apply stress only in one direction and switch the power switch 5 between the "OFF" state and the "ON" state. On the other hand, when the movable portion 36 is not urged by the spring 38, it is necessary for the operator 33 to apply stress in one direction to move the movable portion 36 and then apply stress in a direction opposite to the movement direction in order to move the movable portion 36 back to its original position. Compared with such a case, the operator 33 can more easily operate the power switch 5.

Figure 13:
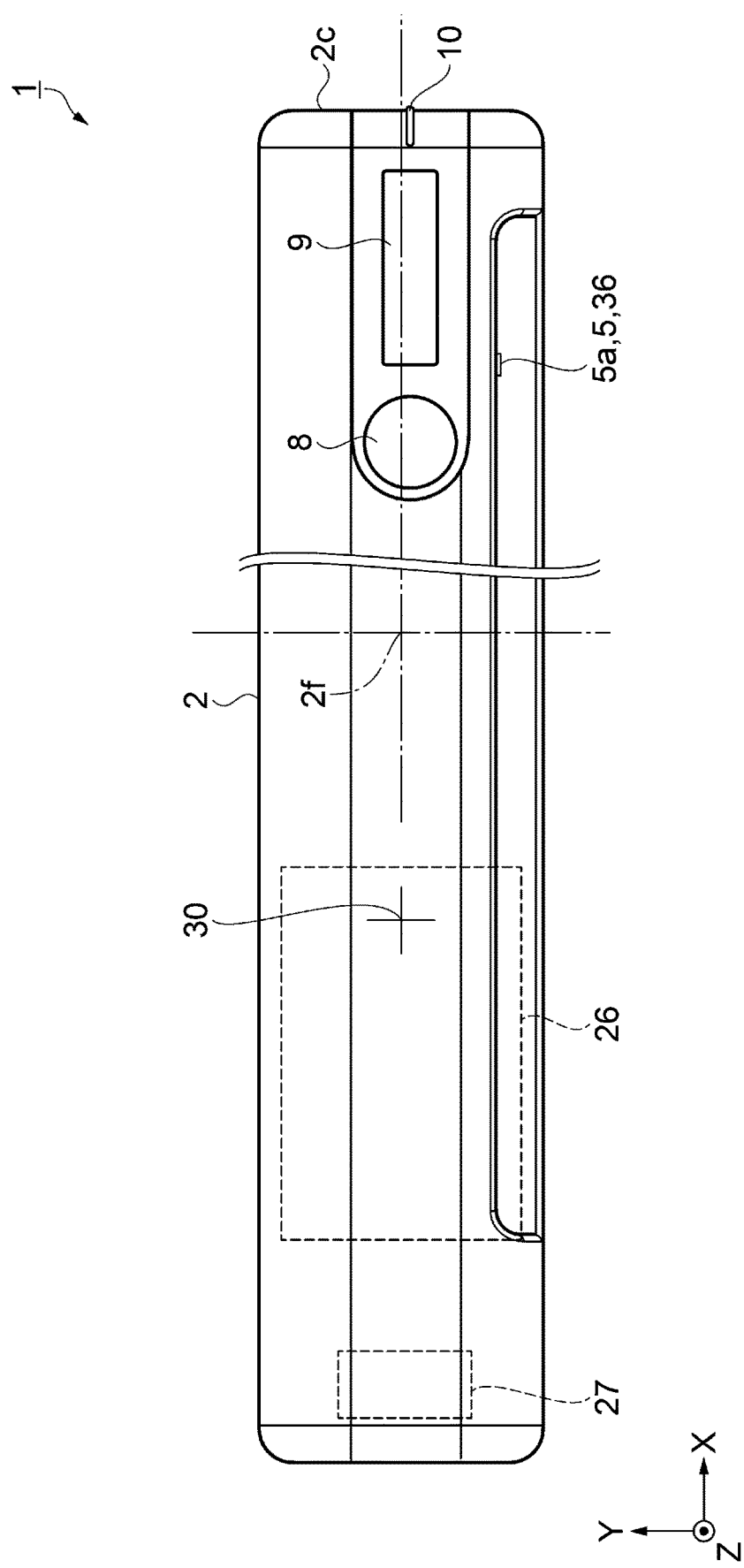
FIG. 13 is a schematic plan view for explaining the positions of the power switch and a second display unit.

FIG. 13 is a schematic plan view for explaining the positions of the power switch and the second display unit. As illustrated in FIG. 13, the power switch 5 is disposed, with respect to the center 2f of the housing 2 in the longitudinal direction, on the side opposite to the center of gravity 30. When the operator 33 stores the reading device 1 so as to be in an erect position, the heavier portion is on the lower side and the lighter portion is on the upper side. The lower side is the ground side and the upper side is the ceiling side. When the reading device 1 is stored in a container such as a briefcase or the like which opens to the upper side, the upper side of the reading device 1 is close to the opening. At this time, the operator can easily grasp the upper side of the reading device 1. In the housing 2, which is long, because the power switch 5 is on the side gripped by the operator 33, the operator 33 can easily turn on the power switch 5 even with one hand.

The second display unit 10 is arranged, with respect to the center 2f of the housing 2 in the longitudinal direction, on the first side surface 2c opposite to the center of gravity 30. The second display unit 10 displays the state of charge of the rechargeable battery 26. When the operator 33 stores the reading device 1 so as to be in an erect position, the heavier portion is on the lower side and the lighter portion is on the upper side. When the operator 33 houses the reading device 1 in a container that opens to the upper side, the upper side of the reading device 1 is near the opening. In this case, the operator 33 can easily confirm the second display unit 10 arranged on the first side surface 2c on the upper side of the reading device 1.

Figure 14:
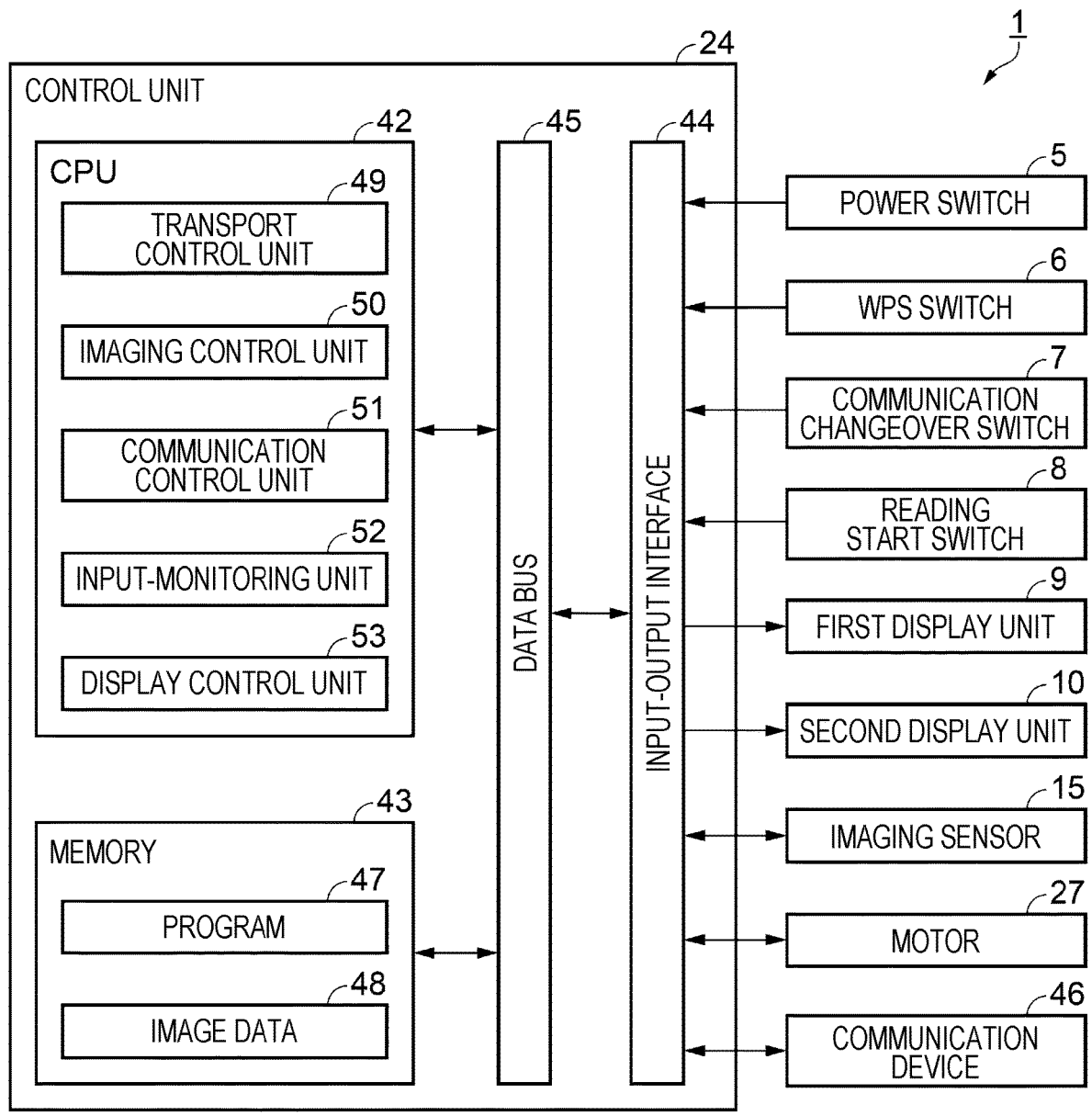
FIG. 14 is an electric block diagram illustrating a configuration of a control unit.

FIG. 14 is an electric block diagram illustrating the configuration of the control unit. In FIG. 14, the control unit 24 includes a CPU 42 (central processing unit) for performing various arithmetic processing operations as a processor and a memory 43 as a storage unit for storing various kinds of information. The power switch 5, the WPS switch 6, the communication changeover switch 7, and the reading start switch 8 are connected to the CPU 42 via an input-output interface 44 and a data bus 45. In addition, the first display unit 9, the second display unit 10, the imaging sensor 15, the motor 27, and a communication device 46 are connected to the CPU 42 via the input-output interface 44 and the data bus 45.

The power switch 5 is a switch for switching between a standby state and a stopped state. When the operator 33 operates the power switch 5, the power switch 5 outputs a signal indicating that the power switch 5 has been operated to the control unit 24.

The WPS switch 6 is a switch for accepting an instruction to output a radio wave signal necessary for communication setting. When the operator 33 operates the WPS switch 6, the WPS switch 6 outputs a signal indicating that it has been operated to the control unit 24.

The communication changeover switch 7 is a switch for switching the way in which data is transmitted to one of the wireless LAN unit and the USB unit. When the operator 33 operates the communication changeover switch 7, the communication changeover switch 7 outputs a signal indicating that it has been operated to the control unit 24.

The reading start switch 8 is a switch for causing the reading device 1 to start reading the document 12. When the operator 33 operates the reading start switch 8, the reading start switch 8 outputs a signal indicating that it has been operated to the control unit 24.

The first display unit 9 displays the state of the reading device 1. The first display unit 9 is composed of a liquid crystal display device or the like. The second display unit 10 receives an instruction signal from the control unit 24 and displays information on the state of the rechargeable battery 26 of the reading device 1. The second display unit 10 is composed of an LED or the like capable of displaying multiple colors.

The imaging sensor 15 captures the image recorded on the document 12. Then, the data of the captured image is output to the control unit 24. The imaging sensor 15 is composed of the line sensor 21, the light source 18, and the like.

The motor 27 receives an instruction signal from the control unit 24 and rotates the document-transporting unit 16. Then, the document 12 transported to a position where the document-transporting unit 16 faces the imaging sensor 15.

The communication device 46 is a device that the reading device 1 uses to perform transmission to an external device. The communication device 46 transmits image data to an external device using one of the wireless LAN unit and the USB unit.

The memory 43 is a concept including a semiconductor memory such as RAM, ROM, and the like. The memory 43 stores a program 47 in which the control procedure of the operation of the reading device 1 is described. In addition, the memory 43 stores image data 48, which is data of an image captured by the imaging sensor 15. In addition, the memory 43 includes a work area for the CPU 42, a storage area functioning as a temporary file, and the like, and various other storage areas.

The CPU 42 controls the imaging sensor 15 and the document-transporting unit 16 in accordance with the program 47 stored in the memory 43. The CPU 42 on which the program 47 operates has a transport control unit 49 as a specific function realizing unit. The transport control unit 49 outputs a control signal to the motor 27 to move the document 12 to the document-transporting unit 16.

In addition, the CPU 42 has an imaging control unit 50. The imaging control unit 50 outputs a control signal to the imaging sensor 15 to capture an image recorded on the document 12. Then, the image data 48 is stored in the memory 43.

In addition, the CPU 42 has a communication control unit 51. The communication control unit 51 outputs a control signal for performing communication with the communication device 46. Then, the communication control unit 51 outputs the image data 48 to the external device. In addition, the CPU 42 has an input-monitoring unit 52. The input-monitoring unit 52 monitors inputs of the power switch 5 and the WPS switch 6. In addition, the input-monitoring unit 52 monitors whether or not the communication changeover switch 7 has been switched. In addition, a document sensor (not illustrated) that detects whether or not the document 12 is inserted between the imaging sensor 15 and the document-transporting unit 16 is provided in the reading device 1. The input-monitoring unit 52 monitors the output of the document sensor and monitors whether or not the document 12 has been inserted between the imaging sensor 15 and the document-transporting unit 16. Furthermore, the input-monitoring unit 52 monitors whether the rechargeable battery 26 is being charged or discharged and monitors the remaining amount of charge of the rechargeable battery 53.

In addition, the CPU 42 has a display control unit 53. The display control unit 53 outputs a state signal indicating the state of the reading device 1 to the first display unit 9. The contents indicated by this state signal include the number of the documents 12 read by the reading device 1, a read standby state, a data transmission state, a document insertion waiting state, and the like. Then, information indicating the state of the reading device 1 is displayed on the first display unit 9. Furthermore, the display control unit 53 outputs a state signal indicating the state of the rechargeable battery 26 to the second display unit 10. The state indicated by the state signal includes a charging state, a discharging state, a state in which the remaining amount of charge is small, a charging completion state, and the like. Then, information indicating the state of the rechargeable battery 26 is displayed on the second display unit 10.

Next, the operation procedure of the reading device 1 will be described. First, the operator 33 grips the reading device 1 stored in the briefcase. There is an opening on the upper side of the briefcase, and the opening is set facing the opposite side to the direction of gravity. When the reading device 1 is stored in an erect position, the power switch 5 is located on the opening side of the briefcase. The operator 33 grips the reading device 1 and slides the power switch 5 with their finger. By this operation, a signal is output from the power switch 5 to the input-monitoring unit 52.

The CPU 42 switches the driving state from the stopped state to the standby state. In the standby state, the transport control unit 49 energizes the motor 27 to prepare for driving. Furthermore, the imaging sensor 15 is driven to prepare for imaging.

Next, the operator 33 sets the communication changeover switch 7. If communication setting is not performed when the wireless LAN is used, the communication setting is performed by operating the WPS switch 6.

Next, the operator 33 inserts the document 12 into the document insertion port 4. The document 12 travels along the document guide surface 3b. The front edge of the document 12 strikes a point between the imaging sensor 15 and the document-transporting unit 16. Next, the operator 33 operates the reading start switch 8. The input-monitoring unit 52 detects the input of the reading start switch 8 and outputs an instruction signal for starting driving to the transport control unit 49 and the imaging control unit 50. The transport control unit 49 drives the motor 27 to move the document 12 to the document-transporting unit 16 at a predetermined speed. The imaging control unit 50 drives the imaging sensor 15 to capture an image of the document 12.

The communication control unit 51 outputs the image data 48 that has been captured to an external device. When the document 12 passes the imaging sensor 15, the transport control unit 49 stops driving the motor 27 and waits in the standby state.

When the operator 33 operates the power switch 5, a signal is output from the power switch 5 to the input-monitoring unit 52. The CPU 42 switches from the standby state to the stopped state. In the stopped state, functions other than those of the input-monitoring unit 52 are stopped. When the operator 33 starts charging the rechargeable battery 26, the input-monitoring unit 52 switches the color of the second display unit 10 to a color indicating that it is being charged and causes it to emit light in that color. When the charge of the rechargeable battery 26 reaches the maximum amount of charge, the input-monitoring unit 52 switches the color of the second display unit 10 to a color indicating that the charge has reached the maximum charge amount and causes it to emit light in that color. The operator 33 recognizes that charging has ended by checking the second display unit 10.

As described above, the present embodiment has the following effects.

(1) According to the present embodiment, the reading device 1 includes the imaging sensor 15, the document-transporting unit 16, the control unit 24, and the housing 2. The document 12 is transported to a position where the document-transporting unit 16 faces the imaging sensor 15. Then, the imaging sensor 15 reads the image. The control unit 24 controls the document-transporting unit 16 and the imaging sensor 15. Transporting of the document 12 and reading of the image are performed in parallel and the document is discharged to the outside of the reading device 1.

The power switch 5, the WPS switch 6, and the communication changeover switch 7 are provided in the housing 2, and the power switch 5, the WPS switch 6, and the communication changeover switch 7 are electrically connected to the control unit 24. When the operator 33 operates the power switch 5, the WPS switch 6 and the communication changeover switch 7, the control unit 24 inputs signals associated with the operation of the power switch 5, the WPS switch 6, and the communication changeover switch 7. Then, the control unit 24 performs predetermined operations in accordance with the operation of the power switch 5, the WPS switch 6, and the communication changeover switch 7. The power switch 5, the WPS switch 6, and the communication changeover switch 7 are provided in the recessed portion 3. When the reading device 1 is stored in a briefcase and moved, or when there is the object 34 not fixed in the vicinity of the inside of the briefcase, the housing 2 may be pressed against or brought into contact with the object 34 in some cases. At this time, because the object 34 comes into contact with the outside of the housing 2, it hardly enters the recessed portion 3. Therefore, because it is difficult for the object 34 to reach the power switch 5, the WPS switch 6, and the communication changeover switch 7, it is possible to suppress erroneous operation of the power switch 5, the WPS switch 6, and the communication changeover switch 7 by the object 34.

(2) According to the present embodiment, the recessed portion 3 has the first wall portion 3a in the longitudinal direction of the housing 2. The first wall portion 3a corresponds to a side surface of the recessed portion 3 connected to the document guide surface 3b. The closer the movable portion 36 of the power switch 5 is to the first wall portion 3a, the less likely the power switch 5 will be operated erroneously; however, the harder it is to operate the power switch 5. The distance between the movable portion 36 of the power switch 5 and the first wall portion 3a is 1 cm or more and 5 cm or less. At this time, the power switch 5 is less likely to be erroneously operated by the object 34, but it can be easily operated when the operator 33 wants to operate it.

(3) According to the present embodiment, the power switch 5 is a slide switch. To operate the slide switch, the operator 33 moves the movable portion 36 along the surface on which the slide switch is provided. Because the power switch 5 is in the recessed portion 3, when the object 34 moves in the +Y direction, the probability that the object 34 will push the power switch 5 is high. However, in order for the object 34 to operate the slide switch, it is first necessary for the object 34 to reach the surface on which the slide switch is provided. Furthermore, it is necessary for the object 34 to move the movable portion 36 in the +X direction along the surface on which the slide switch is provided. In this manner, because the object 34 needs to move in two directions in order to operate the slide switch, it is possible to inhibit the object 34 from accidentally operating the slide switch.

(4) According to the present embodiment, in the power switch 5, the movable portion 36 is urged by the spring 38. When the operator 33 operates the power switch 5, the operator 33 moves the movable portion 36 against the force of the spring 38. Then, the control unit 24 inputs a signal associated with the operation of the power switch 5. Thereafter, the operator 33 stops holding the movable portion 36, whereby the movable portion 36 is pressed by the spring 38 and moves to the original position. Therefore, the operator 33 operates the power switch 5 by applying stress only in one direction. On the other hand, when the movable portion 36 is not urged by the spring 38, it is necessary for the operator 33 to apply stress in one direction to move the movable portion 36 and then apply stress in a direction opposite to the movement direction in order to move the movable portion 36 back to its original position. Compared with this case, the operator 33 can more easily operate the power switch 5 in the reading device 1.

(5) According to the present embodiment, the first display unit 9 is provided on the upper surface of the housing 2. The distance between the power switch 5 and the first display unit 9 is 1 cm or more and 7 cm or less. Because the distance between the power switch 5 and the first display unit 9 is 1 cm or more, a portion of the housing 2 can be arranged between the power switch 5 and the first display unit 9. The housing 2 can be configured to hold the power switch 5 and the first display unit 9. When the operator 33 operates the power switch 5, the operator 33 can easily see the power switch 5. At this time, because the distance between the first display unit 9 and the power switch 5 is close, which is 7 cm, the operator 33 can have the power switch 5 and the first display unit 9 in their field of view at the same time. The control unit 24 inputs a signal associated with the operation of the power switch 5 and causes the first display unit 9 to perform display in accordance with the input of the signal. At this time, the operator 33 can easily confirm that the operation of the power switch 5 has worked.

(6) According to the present embodiment, the power switch 5 is disposed, with respect to the center 2f of the housing 2 in the longitudinal direction, on the side opposite to the center of gravity 30. When the operator 33 stores the reading device 1 so as to be in an erect position, the heavier portion is on the lower side and the lighter portion is on the upper side. The lower side is the ground side and the upper side is the ceiling side. When the reading device 1 is housed in a container that opens to the upper side, the upper side of the reading device 1 is near the opening. At this time, the operator 33 can easily grasp the upper side of the reading device 1. In the housing 2, which is long, because the power switch 5 is on the side gripped by the operator 33, the operator 33 can easily turn on the power switch 5 with one hand.

(7) According to the present embodiment, the power switch 5 is disposed on the right-hand side when the housing 2 is viewed from the recessed portion 3 side. When the reading device 1 is placed on a desk, the power switch 5 is arranged on the right-hand side. If the operator 33 is right handed, the power switch 5 can be easily operated by the dominant right hand.

(8) According to the present embodiment, the document insertion port 4 for guiding the document 12 to the document-transporting unit 16 is disposed in the recessed portion 3. Therefore, when the operator 33 wants to perform an operation to read the document 12, the operator inserts the document 12 into the document insertion port 4. The document insertion port 4 is provided in the recessed portion 3 and the power switch 5 is provided in the recessed portion 3. Therefore, when the operator 33 inserts the document 12 into the document insertion port 4, it is possible to easily see the position of the power switch 5.

(9) According to the present embodiment, the reading device 1 includes the rechargeable battery 26 and the second display unit 10. The second display unit 10 displays the state of charge of the rechargeable battery 26. The second display unit 10 is disposed, with respect to the center 2f of the housing 2 in the longitudinal direction, on the first side surface 2c opposite to the center of gravity 30. When the operator 33 stores the reading device 1 so as to be in an erect position, it is easy for the heavier portion to be on the lower side and the lighter portion to be on the upper side. The lower side is the ground side and the upper side is the ceiling side. When the operator 33 houses the reading device 1 in a container that opens to the upper side, the first side surface 2c of the reading device 1 is close to the opening. At this time, the operator 33 can easily see the second display unit 10 arranged on the first side surface 2c of the reading device 1.

(10) According to the present embodiment, because the power switch 5 is provided in the recessed portion 3 formed across the front side surface 2i and the upper surface 2b, erroneous operation of the power switch 5 can be suppressed and operability can be improved.

(11) According to the present embodiment, the power switch 5 is formed on the second wall portion 3c of the recessed portion 3. Therefore, erroneous operation of the power switch 5 can be suppressed and operability can be improved.

In addition, it should be noted that the present embodiment is not limited to the above-described embodiments, and various modifications and improvements can be made by a person ordinarily skilled in the art within the technical idea of the invention. A modification example will be described below.

Modification Example 1

In the above embodiment, a slide switch is used as the power switch 5. As the power switch 5, a toggle switch or a rotary switch may be adopted. By providing any of the switches in the recessed portion, erroneous operation thereof can be suppressed.

Modification Example 2

In the above embodiment, the spring 38, which is a coiled compression spring, urges the movable portion 36. The member that urges the movable portion 36 may have elasticity. For example, a leaf spring, a tension spring, any of various rubbers, a torsion spring or the like can be used.

The entire disclosure of Japanese Patent Application No. 2018-006211, filed Jan. 18, 2018 is expressly incorporated by reference herein.

What is claimed is:
1. A reading device comprising:
an imaging sensor that reads a document;
a document-transporting unit that transports the document to a position facing the imaging sensor;
a document-pressing plate upstream of the document-transporting unit and having an end urged away from the document-transporting unit;
a control unit that controls the imaging sensor and the document-transporting unit;
a housing that covers the imaging sensor, the document-transporting unit, and the control unit; and a switch electrically connected to the control unit,
wherein a recessed portion is formed in the housing and the switch is disposed in the recessed portion.

2. The reading device according to claim 1,
wherein, in the case where a document insertion side surface is a front side surface of the reading device and a document discharge side surface is a rear side surface of the reading device, a device upper surface is provided between the front side surface and the rear side surface, and the recessed portion is formed across the front side surface and the device upper surface.

3. The reading device according to claim 2,
wherein the recessed portion has a guide surface that guides the document that is transported and an erected surface that is erected from the guide surface toward the device upper surface, and the switch is arranged on the erected surface.

4. The reading device according to claim 1,
wherein the recessed portion has wall portions on both sides of the housing in the longitudinal direction, and
wherein a distance between a movable portion of the switch and a corresponding one of the wall portions is 1 cm or more and 5 cm or less.

5. The reading device according to claim 1,
wherein the switch is a slide switch that has a movable portion that slides.

6. The reading device according to claim 5,
wherein the movable portion of the switch is urged by an elastic member.

7. The reading device according to claim 1,
wherein a first display unit for displaying information is provided on a device upper surface, and
wherein a distance between the switch and the first display unit is 1 cm or more and 7 cm or less.

8. The reading device according to claim 1,
wherein the switch is a power switch, and
wherein the switch is arranged, with respect to a center of the housing in a longitudinal direction, on a side opposite to a center of gravity.

9. The reading device according to claim 8,
wherein the switch is disposed on a right-hand side when the housing is viewed from a recessed portion side.

10. The reading device according to claim 8,
wherein power is turned on by sliding the switch in a direction opposite to the center of gravity.

11. The reading device according to claim 1,
wherein a document insertion port that guides the document to the document-transporting unit is disposed in the recessed portion.

12. The reading device according to claim 1 further comprising:
a rechargeable battery; and
a second display unit that displays a state of charge of the rechargeable battery,
wherein the second display unit is arranged, with respect to a center of the housing in a longitudinal direction, on an end surface opposite to a center of gravity.

13. A reading device comprising:
an imaging sensor that reads a document;
a document-transporting unit that transports the document to a position facing the imaging sensor, the document-transporting unit being driven by a motor;
a control unit that controls the imaging sensor and the document-transporting unit;
a housing that covers the imaging sensor, the document-transporting unit, and the control unit; and
a switch electrically connected to the control unit,
wherein a recessed portion is formed in the housing and the switch is disposed in the recessed portion,
wherein a center of gravity of the reading device is closer to the motor than to the switch in a longitudinal direction of the housing.

* * * * *